United States Patent
Jörgens et al.

(10) Patent No.: US 8,675,239 B2
(45) Date of Patent: Mar. 18, 2014

(54) METHOD AND DEVICE FOR CORRECTING PAPER SHRINKAGE DURING GENERATION OF A BITMAP

(75) Inventors: Dieter Jörgens, Baldham (DE); Herbert Gibisch, München (DE); Peter Thiemann, München (DE)

(73) Assignee: Océ Printing Systems GmbH, Poing (DE)

( * ) Notice: Subject to any disclaimer, the term of this patent is extended or adjusted under 35 U.S.C. 154(b) by 2391 days.

(21) Appl. No.: 10/572,274

(22) PCT Filed: Sep. 23, 2004

(86) PCT No.: PCT/EP2004/010687
§ 371 (c)(1),
(2), (4) Date: Dec. 11, 2006

(87) PCT Pub. No.: WO2005/031470
PCT Pub. Date: Apr. 7, 2005

(65) Prior Publication Data
US 2007/0172270 A1 Jul. 26, 2007

(30) Foreign Application Priority Data
Sep. 24, 2003 (DE) .............................. 103 44 238 U (51) Int. Cl.
*G06K 15/00* (2006.01)
(52) U.S. Cl.
USPC ........... 358/1.18; 358/1.2; 358/1.9; 358/1.12; 399/45; 399/301; 347/116
(58) Field of Classification Search
USPC ................. 358/1.4, 1.2, 1.9, 3.24, 1.12, 1.18; 399/45, 301; 347/116
See application file for complete search history.

(56) References Cited

U.S. PATENT DOCUMENTS

| 4,721,969 A | 1/1988 | Asano |
| 5,093,674 A * | 3/1992 | Storlie ........................ 347/116 |

(Continued)

FOREIGN PATENT DOCUMENTS

| DE | 101 11 216 | 9/2001 |
| EP | 0 469 282 | 2/1992 |

(Continued)

OTHER PUBLICATIONS

Patent Abstracts of Japan—Publication No. 01266959 A—Oct. 24, 1989.

(Continued)

*Primary Examiner* — King Poon
*Assistant Examiner* — Jamares Q Washington
(74) *Attorney, Agent, or Firm* — Schiff Hardin LLP (57) ABSTRACT

In a method for printing a recording medium, an object type of image elements to be printed is determined for a corresponding print page using digital data. In generation of a bitmap for generation of a latent image for a first print process or a second print process, dependent on the object type image points are adapted in a direction of at least one main axis corresponding to an expected shrinkage. The recording medium is printed with a first toner image in a first print process. The first toner image is fixed on the recording medium in the fixing device where the recording medium shrinks along said at least one main axis. In the second print process, a second toner image is applied on the same recording medium in the direction of the main axis in a form compressed relative to that of the first print process.

28 Claims, 10 Drawing Sheets

(56) References Cited

U.S. PATENT DOCUMENTS

| | | | | |
|---|---|---|---|---|
| 5,485,565 | A | * | 1/1996 | Saund et al. ............... 345/442 |
| 5,519,815 | A | * | 5/1996 | Klassen ...................... 358/1.9 |
| 5,767,978 | A | * | 6/1998 | Revankar et al. ............ 358/296 |
| 5,818,978 | A | * | 10/1998 | Al-Hussein .................. 382/296 |
| 6,094,560 | A | * | 7/2000 | Thomas ....................... 399/341 |
| 6,101,364 | A | | 8/2000 | Boehmer et al. |
| 6,806,896 | B2 | * | 10/2004 | Conrow et al. ............. 347/248 |
| 2001/0021027 | A1 | | 9/2001 | Ueno et al. |
| 2002/0181021 | A1 | * | 12/2002 | Stephens ..................... 358/1.18 |

FOREIGN PATENT DOCUMENTS

| | | |
|---|---|---|
| EP | 0 685 959 | 12/1995 |
| JP | 62-230156 | 10/1987 |
| JP | 1-266568 | 10/1989 |
| JP | 1-266959 | 10/1989 |
| JP | 4-85060 | 3/1992 |
| JP | 2001-13752 | 1/2001 |
| JP | 2001-88363 | 4/2001 |
| WO | WO 94/27193 | 11/1994 |
| WO | WO 98/18054 | 4/1998 |

OTHER PUBLICATIONS

Patent Abstracts of Japan—Publication No. 2001013752 A Jan. 19, 2001.

* cited by examiner

METHOD AND DEVICE FOR CORRECTING PAPER SHRINKAGE DURING GENERATION OF A BITMAP

BACKGROUND

The preferred embodiment concerns a method and a device for printing of a recording medium in which a recording medium is printed with a first toner image in a first printing process by a printing device; the first toner image is fixed on the recording medium in a fixing device, whereby the recording medium shrinks along at least one main axis; and in which the same recording medium is subsequently printed with a second toner image in a second printing process.

There are numerous print operating modes in which a recording medium passes through a fixing process after the printing with a first toner image. In this fixing process, which generally occurs under pressure and relatively high temperature, the moisture in the recording medium (generally paper) is reduced, whereby a shrinking occurs in the longitudinal direction and/or width direction. The shrinking effect can be different in both of these directions, dependent on the fiber direction in the paper. The degree of the shrinkage likewise depends on the parameters of the fixing process. When a further toner image is subsequently applied on the same recording medium, given an otherwise identical printing process both print images are no longer in registration with one another, which leads to quality losses. The shrinking in the direction of a main axis can typically be up to 1%, meaning the shrinking in the longitudinal direction can be more than 2 mm given a sheet of the size DIN-A 4. The effect is even more distinct given even larger formats.

A method for operation of a printer with two printing groups in which various printing modules can be realized is known from WO 98/18054 by the same applicant. In a duplex printing operation, individual sheets are printed on both sides, whereby a fixing occurs between the respective printing processes. Another operating mode is the two-color simplex printing, in which two image patterns of different color are printed on the front side of a single sheet. This operating mode is also known as highlight color printing. A further operating mode is two-color duplex printing, in which the front side and the back side of a single sheet are printed with image patterns of different color. Further reference is made again below to the cited printed document in connection with the specification of an exemplary embodiment. This printed document is herewith incorporated by reference into the disclosure content of the present patent application.

Printing systems and printing methods in which print images to be generated are corrected dependent on a shrinking of the carrier material are known from the documents DE 101 11 216 A1 and JP 01-266568. Such a shrinking of the carrier material in particular arises due to heat effect on a recording medium on which the print image should be generated. From the document EP 0 685 959 A2 it is known to analyze images stored in pixel form with the aid of raster cells that comprise 2×2 raster cells and to check whether color transitions from black to white raster cells are present. Also known from the document EP 0 469 282 A2 is a printing method or a printing system in which the size of color extractions of a print image printed over one another on a carrier material paper shrinking of which occurs upon fixing of each color extraction.

Furthermore, an electrographic printing device for printing of band-shaped recording media of different band widths is known from EP 0 699 315 A1. A paper band is transported to and printed at a single printing group with a usable width of at least double the width of the paper band in a juxtaposition. An intermediate fixing of the first toner image occurs in the various printing operating modes, whereby a shrinking of the paper web occurs. The content of this document is discussed in detail in connection with the specification of exemplary embodiments. This document is hereby incorporated by reference into the disclosure content of the present patent application.

A method and a device for printing of a recording medium is known from the document JP 2001-013752, in which a recording medium is printed in at least two print process with respectively one toner image, whereby the toner images are fixed on the recording medium after each print process. The recording medium shrinks due to this fixing process, whereby an adaptation of the size of the print images corresponds to the shrinkage is required.

Further image generation methods and image generation devices in which a size adaptation of print images is implemented are known from the documents U.S. Pat. No. 4,721,969; JP 04085060; JP 62230156 and US 2003/0174200.

It is possible to reduce the shrinking effect in that the carrier material is brought to a low relative moisture via drying before the printing process. The shrinking effect is then reduced in the subsequent first fixing. However, such a measure is connected with a high expenditure. Another possibility is to climatically treat the carrier material after the first fixing process and to reproduce the original relative moisture prevailing in the first printing process. The shrinking process occurring in the fixing is thus reversed. This measure is also connected with a very high technical expenditure.

SUMMARY

It is an object to specify a method and a device that allows a high print quality to be generated on the carrier material with relatively low technical effort.

In a method for printing a recording medium, an object type of image elements to be printed is determined for a corresponding print page using digital data. In generation of a bitmap for generation of a latent image for a first print process or a second print process, dependent on the object type image points are adapted in a direction of at least one main axis corresponding to an expected shrinkage. The recording medium is printed with a first toner image in the first print process. The first toner image is fixed on the recording medium in a fixing device where the recording medium shrinks along said at least one main axis. In the second print process, a second toner image is applied on the same recording medium in the direction of the main axis in a form compressed relative to that of the first print process.

BRIEF DESCRIPTION OF THE DRAWINGS

Figure 11:
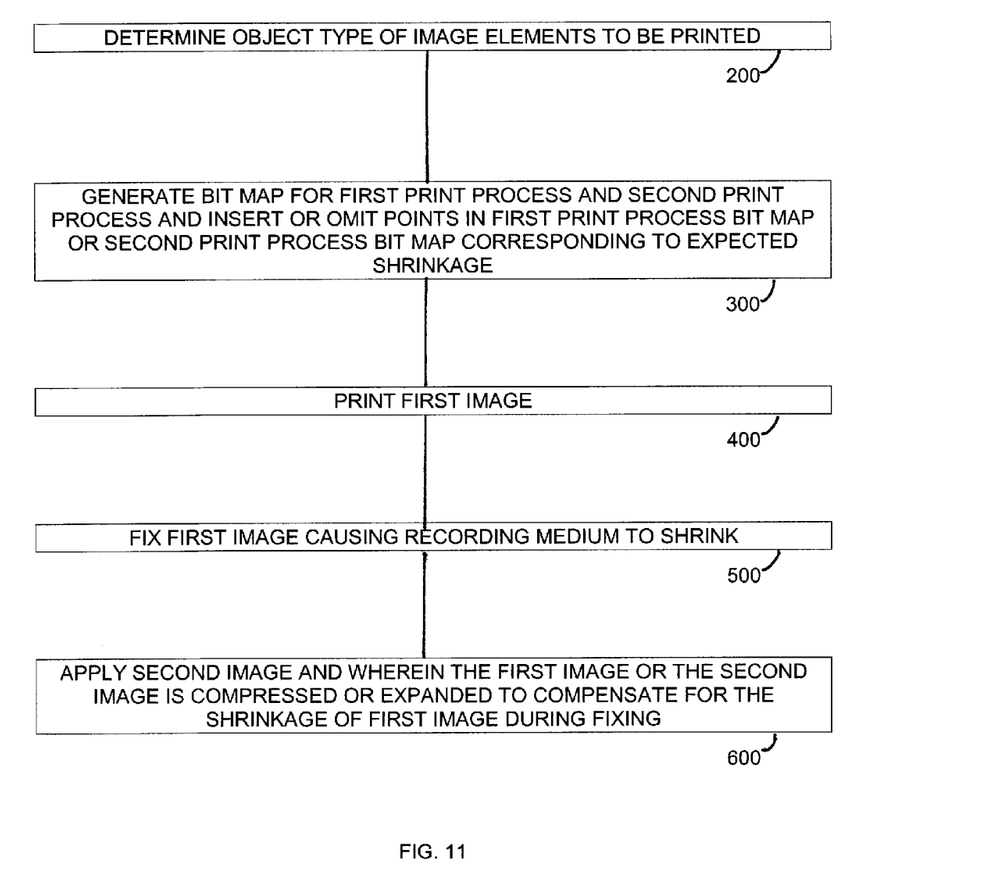
FIG. 11 shows steps according to a method of a preferred embodiment.

FIG. 11 shows method steps 200 through 600 of the preferred embodiment described above.

DESCRIPTION OF THE PREFERRED EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

According to the preferred embodiment concerning a method, the shrinking correction occurs via a software-technical intervention in the generation of the bitmap for the generation of the latent image for the first printing process or for the second printing process. The number of the image points to be taken into account in the printing is thus changed corresponding to the expected shrinkage in the direction of the main axis. The main axis essentially runs in the line direction in which the LED line runs given an LED character generator. In the first printing process, in the generation of the bitmap the print image can be enlarged via insertion of additional image points in the line direction. The associated LEDs are thus controlled such that they produce no image points to be inked at the corresponding image point positions. If the shrinking should be taken into account in the second printing process, the number of the image points to be taken into account in the printing is to be correspondingly reduced in the generation of the associated bitmap. Image points are accordingly omitted and the line length correspondingly shortened in the generation of the bitmap.

The addition of image points for extension of the line or the omission of the image points for shortening of the line advantageously occurs at the same image point positions for successive lines, such that overall print point columns are added or omitted in the bitmap. It is likewise possible to also apply the cited principle when the main axis runs in the transport direction of the recording medium, i.e. image point lines are added or omitted in a similar manner in order to compensate the shrinking.

According to a further aspect of the preferred embodiment, a device is specified for printing of a recording medium. This device enables the compensation of the shrinking effect.

Figure 1:
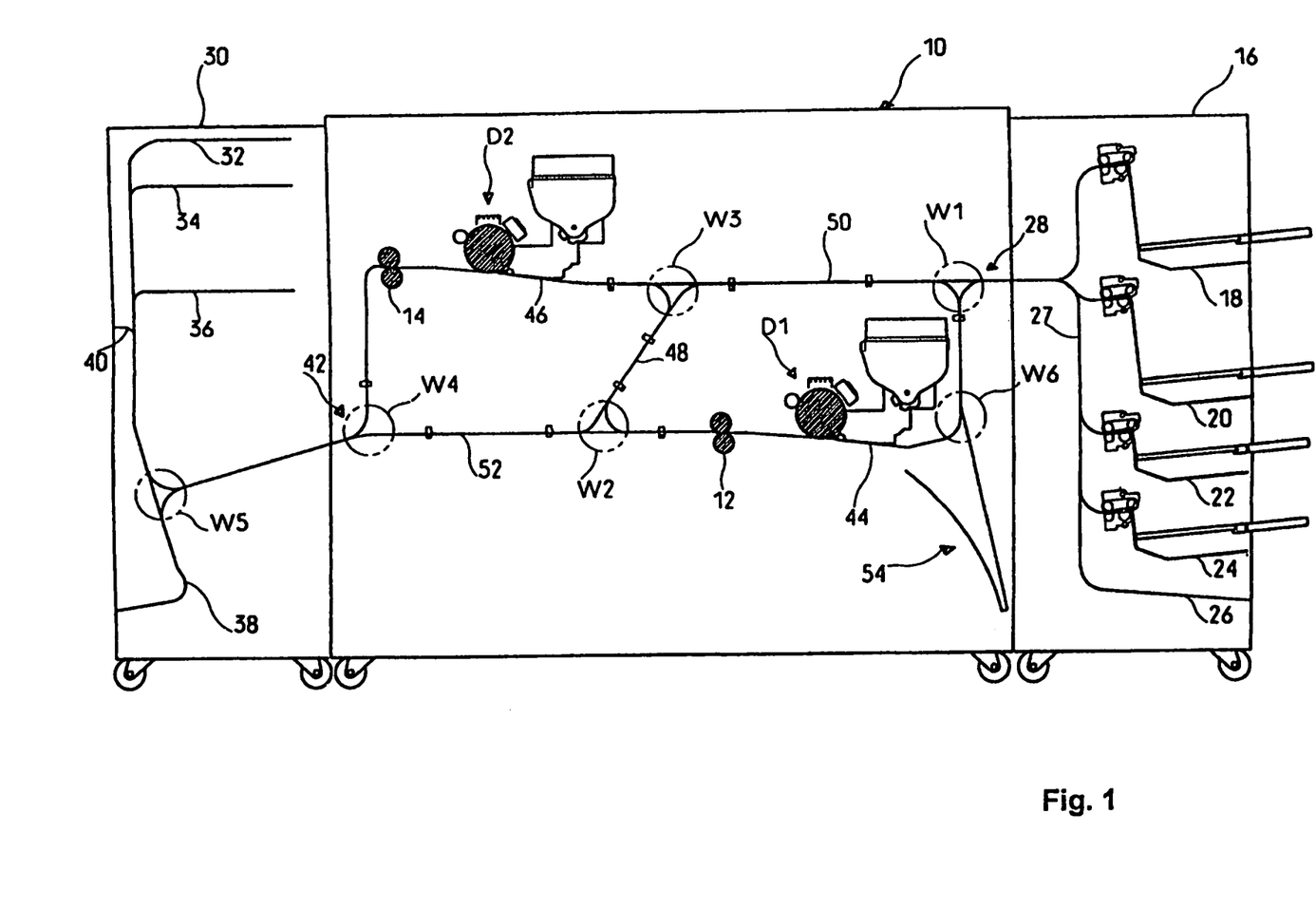
FIG. 1 is a single-sheet printing system with two printing groups and two fixing stations.

A high-capacity printer 10 in which the preferred embodiment can be used is shown in FIG. 1. The high-capacity printer 10 serves for fast printing of single sheets of paper and contains a first printing group D1 as well as a second printing group D2. Both printing groups D1, D2 operate according to the known electrographic method. Respective fixing stations 12, 14 that are schematically indicated by two roller pairs are downstream from the printing groups D1, D2. A paper input 16 that contains a plurality of reservoirs 18 through 24 with single sheets as well as an external paper input channel 26 is connected to the high-capacity printer 10. Single sheets are supplied to an input section 28 via a transport channel 27. On the output side, a paper output 30 that contains a plurality of output reservoirs 32 through 36 is connected to the high-capacity printer 10. Furthermore, two output channels 38, 40 are provided via which the single sheets can be output to further-processing stations. The high-capacity printer 10 delivers the printed single sheets via the output section 42.

Transport paths for the transport of the single sheets are arranged inside the high-capacity printer 10, via which transport paths various operating modes of the high-capacity printer are realized. Transfer printing transport paths 44, 46 that are respectively adjusted by actuators are respectively associated with the printing groups D1, D2, such that the supplied single sheets have their transfer printing speed at the printing groups D1, D2. Both transfer printing transport paths 44, 46 are connected with one another via a connection channel 48. The transport path around the first printing group D1 is expanded into a ring via a feed channel 50 via which single sheets can also be fed from the input section 28 to the second transfer printing transport path 46. The transport path for the second printing group D2 is expanded in a similar manner into a ring via a discharge channel 52 via which printed single sheets can be fed from the printing group D1 to the output section 42.

A first shunt W1 is arranged between the input section 28, the first transfer printing transport path 44 and the feed channel 50, which first shunt W1 enables single sheets to be selectively supplied from the input section 28 to the first transfer printing transport path 44 or to the feed channel 50. A further variant exists in that single sheets transported on the feed channel 50 in the direction of the first shunt W1 can be supplied to the first transfer printing transport path 44.

Furthermore, a second shunt W2 and a third shunt W3 are arranged at the ends of the connection channel 48 and respectively connect the adjoining transport paths 44, 48, 52 or 46, 48, 50. A fourth shunt W4 is located in proximity to the output section 42 and connects the adjoining transport paths. The paper output 30 contains a fifth shunt W5 that operates as a turnover device. A control device 54 is also to be indicated to which waste single sheets are fed via a shunt W6.

Various operating modes of the high-capacity printer 10 can be realized via the arrangement described in FIG. 1. In simplex printing, the single sheet is printed on only one side by a printing group D1 or D2 and fixed by the fixing station 12 or 14. The shrinking problem described further above does not occur in this operating mode.

Figure 2:
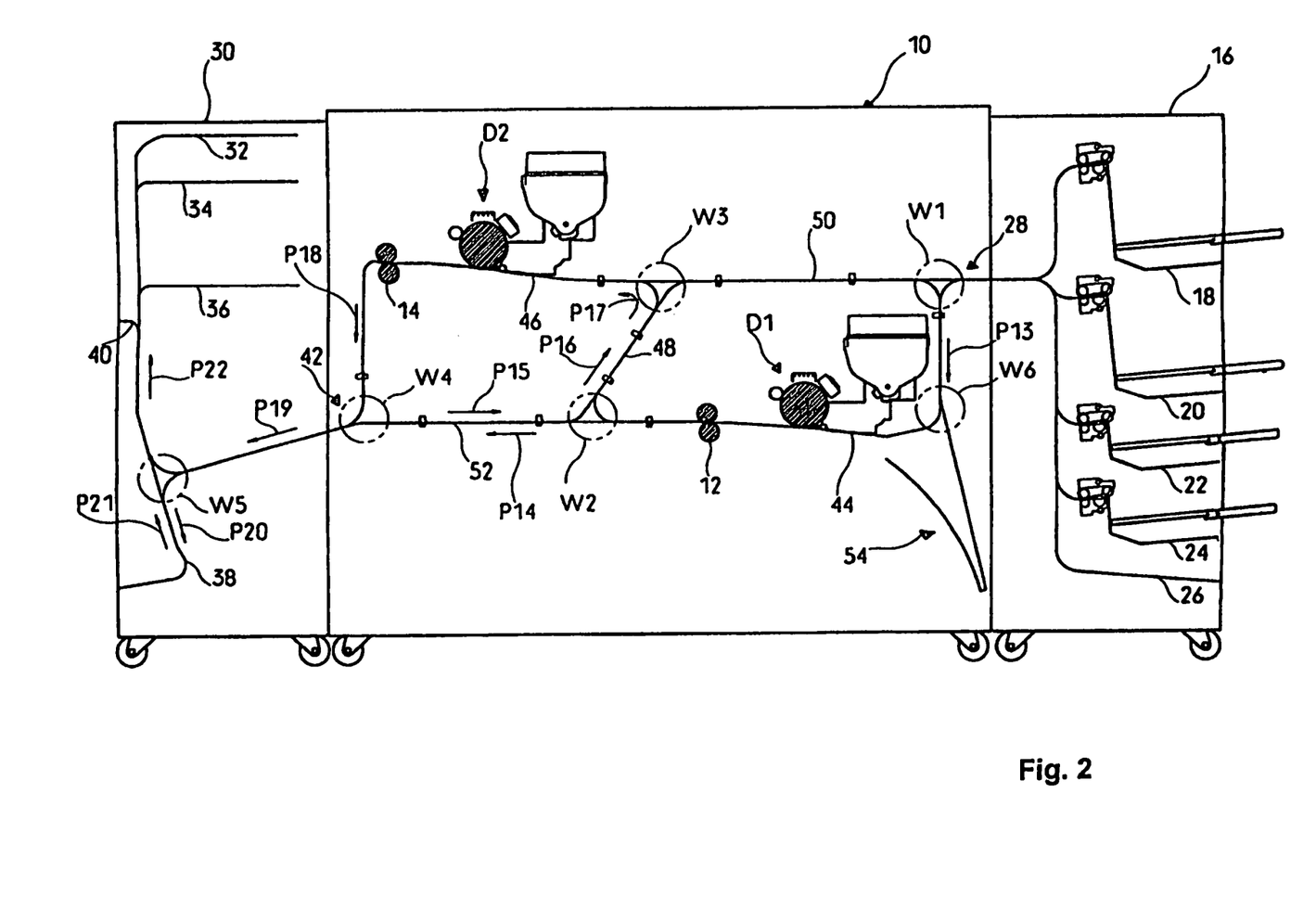
FIG. 2 shows the printing system according to FIG. 1 in the operating mode duplex printing.

FIG. 2 schematically shows the duplex printing operation in which the single sheets are printed on both sides. The single sheets supplied to the input section 28 are supplied to the first transfer printing transport path 44 via the first shunt W1 (arrow P13). After the printing by the printing group D1 and the subsequent fixing in the station 12, the respective single sheet is conveyed via the shunt W2 out along a turnover path according to the arrow P14. This turnover path is a part of the discharge channel 52. The transport direction according to arrow P15 is subsequently reversed and the shunt W2 then directs the single sheet according to the arrow P16 into the connection channel 48. The single sheet is then deflected by the shunt W3 in the direction of the arrow P17 to the second transfer printing transport path 46. The not-yet-printed back side of the single sheet is thus supplied to the printing group D2 for printing. This single sheet is shrunk due to the fixing process. After the second printing, a new fixing process occurs in the fixing station 14 under supply of heat and pressure. The successive single sheets are subsequently supplied to the shunt W4 according to the arrow P18 and transported in the paper output 30 along the arrow P19. Since the single sheet is in this case transported with its back side facing upwards, it is still to be turned before the depositing in the trays 32 through 36. The shunt W5 serves for this. The single sheet is initially directed by the shunt W5 in the direction of the arrow P20 for a predetermined turnover path. The transport direction according to the arrow P21 is then reversed and the shunt W5 transports the single sheet in the direction of the arrow P22, whereupon it is deposited right-side up in the stacking trays 32 through 36.

A further operating mode is two-color simplex printing, also often designated as highlight color printing, in which the front side of a single sheet is printed with two image patterns of different colors. Both printing groups D1, D2 then print image patterns of different colors. In this operating mode, the single sheet is supplied to the printing group D1 via the shunt W1, printed, and fixed for the first time in the fixing station 12, whereby a shrinking occurs. The single sheet is subsequently supplied to the connection channel 48 via the shunt W2 without turnover and then to the printing group D2 via the shunt W3. The printing group D2 prints the shrunk front page with a color different from the color of the printing group D1. The single sheet is subsequently fixed a second time in the fixing station 14 and output to the paper output 30 via the shunt W4. A process workflow is also possible in which the printing group D2 prints first and the printing group D1 prints the second toner image after the fixing.

A further operating mode with intermediate fixing is two-color duplex printing, in which the front side and the back side of a single sheet are printed with image patterns of different colors. It is a requirement for this that the printing groups D1 and D2 print different-colored print images. As in the operating mode described above, two-color simplex printing proceeds for two-color printing of the front side. The single sheet is initially printed two-color on one side with the printing groups D1 and D2. The single sheet is subsequently resupplied to printing group D1 via the channel 48 and the shunts W1 and W6 for printing of the back side. The single sheet must be turned over on the transport path between the printing group D2 and the printing group D1 so that this back side is supplied to the printing group D1. This turnover can, for example, occur at the shunt W4, the shunt W2 or the shunt W3. The second color is then printed on the back side of the single sheet by the printing group D2. The single sheet can experience different shrinkages in the various fixing processes.

The various operating modes are described in greater detail in the already-mentioned WO 98/18054. Reference is herewith made to the statements made there.

Figure 3:
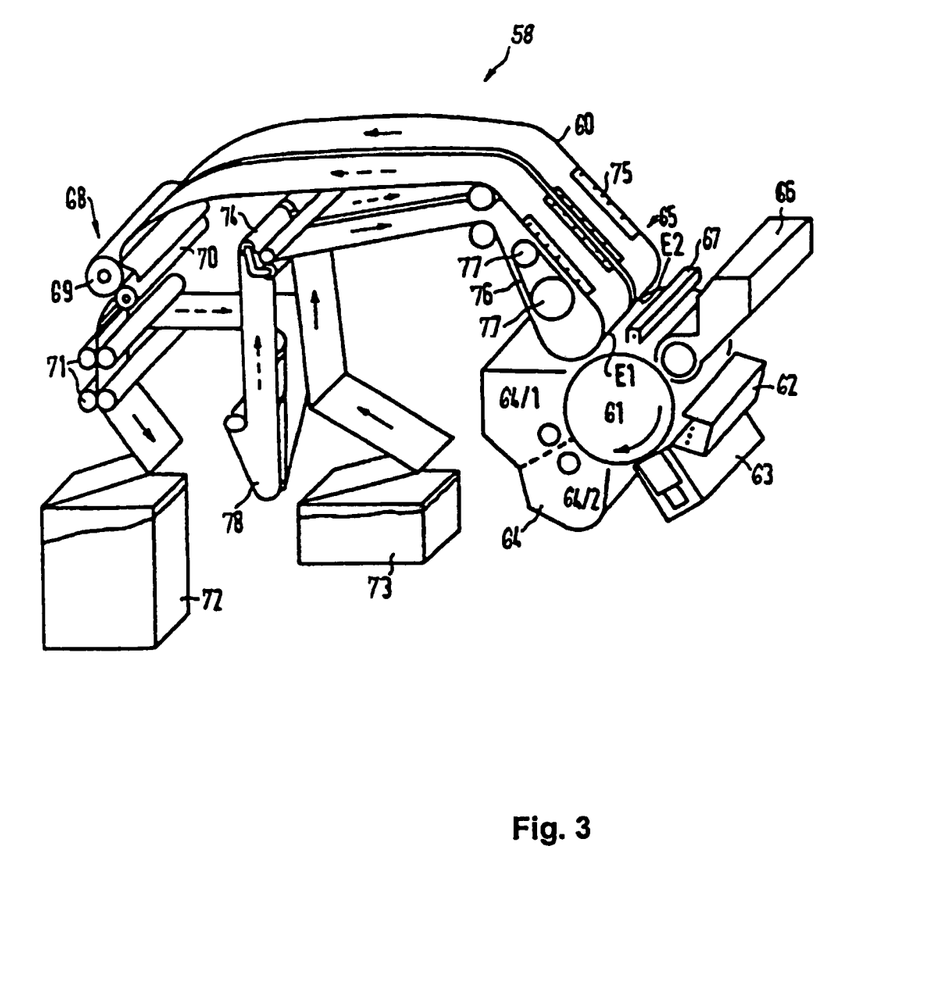
FIG. 3 shows a printing system for a band-shaped paper that is printed twice.

FIG. 3 shows a further example of a high-capacity printing system 58 that operates with a band-shaped carrier material 60. Sections of the carrier material 60 are directed to a photoconductor drum 68 with at least double the width of the band material and printed, whereby an intermediate fixing with the unavoidable shrinking process occurs.

The various units for the electrophotographic process are grouped around the photoconductor drum 61. A charge device 62 in the form of a charge corotron for charging of the intermediate carrier 61, which is designed as a photoconductor drum; an LED character generator 63 with a light-emitting diode comb for character-dependent exposure of the intermediate carrier 61 that extends over the entire usable width of the intermediate carrier 61; a developer station 64 for inking of the character-dependent charge image on the intermediate carrier 61 with the aid of a one- or two-component developer mixture; a transfer printing station 65 that extends over the width of the intermediate carrier 61 and with which the toner images are transferred onto the recording medium. For removal of the residual toner after the development and the transfer printing, a cleaning station 66 is provided with integrated cleaning brush with associated suction device as well as a discharge device 67. The intermediate carrier 61 is driven in an electromotive manner and moved in the arrow direction in the printing operation.

Furthermore, the printing device 58 contains a fixing station 68 downstream from the transfer printing station 65 in the transport direction of the recording medium, which fixing station 68 is designed as a thermoprinting fixing station with a heated fixing roller 69 with associated pressure roller 70, as well as with guidance rollers 71 downstream from the fixing station that, among other things, serve as output elements for a stacker 72 for the recording media 60. Other fixing stations are also possible instead of the shown fixing station, for example with a heated or unheated supply saddle. The band-shaped recording medium 60 is, for example, designed as a pre-folded continuous paper provided with border perforations and, starting from a reservoir region 73, is supplied to the transfer printing station via feed rollers 74. However, it is also possible to supply a recording medium without border perforations via a roller feed.

The transport of the recording medium 60 thereby advantageously occurs via a transport device 75 associated with the transfer printing station 65 in the form of transport bands provided with pins, which transport bands engage in the border perforations of the recording medium 60 as directed via drive shafts 77. For the case that a recording medium free of transport holes is used, an adapted transport device familiar to the average man skilled in the art is to be provided that transports the recording medium via, for example, friction, controlled by a control device scanning synchronization markers. Furthermore, a deflection device 78 via which the recording medium 60 is directed back from the fixing station 68 to the transfer printing station 65 is arranged in the housing region of the printing device between reservoir region 73 and the fixing station 68.

The electrographic printing device is suitable for printing of recording media of different band widths. For these purposes, the intermediate carrier 61 (photoconductor drum) exhibits a usable width that corresponds to the largest possible recording media width (for example, a format DIN A3 across). This width corresponds to double the DIN A4 width. It is therewith possible to arrange two recording medium widths DIN A4 next to one another lengthwise in the region of the transfer printing station 65. The fixing station 68 and the other electrophotographic units (such as developer station 64, character generator 63, cleaning station 66) are designed corresponding to this usable band width.

An adaptation of the width of the character generator 63 to different recording medium widths requires no mechanical alteration to the character generator when (as in this case) an LED character generator with a plurality of LEDs arranged in series is used. An adaptation to the recording medium width used occurs electronically via activation.

The deflection device 78 arranged in a return channel for narrow recording media from the fixing station to the transfer printing station has two tasks: it serves for the lateral offset of the recording medium web in the continuous operation and for front-back side rotation of the recording medium 60 in the turnover operation. It is designed to be switched over dependent on the operating mode.

For two-sided, one-color printing of a narrow recording medium (one-color duplex operation) as it is shown in FIG. 3, starting from the reservoir region 73 the narrow (for example DIN A4 width) recording medium 60 is fed to the transfer printing station 65 via the feed rollers 74 and printed on its top side with a front side toner image. The front side of the recording medium 60 is thereby characterized by elongated transport arrows, the underside by dashed transport arrows. The recording medium 60 with the front side toner image is subsequently supplied to the fixing station 68 and the front side toner image is fixed, whereby a shrinkage of the recording medium 60 occurs. A further transport of the recording medium 60 to the deflection device 78 occurs via the guide rollers 71. The recording medium is turned over (with regard to its front and back side) by the deflection device 78 and re-fed to the transfer printing device 65 via the feed rollers 74 so that its back side can be provided with a back side toner image. The recording medium 60 is subsequently re-fed to the fixing station 68 and the back side toner image is fixed, and the recording medium printed on both sides is subsequently deposited in the stacker 72.

The printing device is also suitable for multicolor printing operation in the operating mode "two-color duplex printing". For this purpose, the developer station 64 is designed such that it generates separate inkable developer zones E1 and E2 on the intermediate carrier 61. A corresponding developer zone E1 or E2 on the intermediate carrier 61 is thereby associated with each position region of the narrow recording medium 60 upon passage through the transfer printing station 65. For generation of these separate inkable developer zones E1 and E2, two developer stations 64/1 and 64/2 arranged in series can be respectively associated with the developer zones. The developer station 64/1 thereby contains a toner mixture of a first color, for example red, and the developer station 64/2 contains a toner mixture in a second color, for example black. The developer stations 64/1 and 64/2 are designed such that they can be activated separately with regard to the developer zones E1 and E2.

In order to be able to print a narrow recording medium 60 on both sides with different colors corresponding to the representation of FIG. 3, the recording medium 60 is directed through the printing device in the manner already described. In a first pass through the transfer printing station 65, the application of a front side image occurs in a first color (for example red) in the developer zone E2 via the developer station 64/1. A fixing subsequently occurs in the fixing station 68. In a second pass through the transfer printing station 65 after the turnover process via the deflection device 78, a back side toner image in a second color (for example black) is applied in the developer zone E1 via the developer station 64/2.

A further operating mode is the "two-color simplex operation", in which a narrow recording medium 60 (of, for example, the width A4) is printed with two colors on one side. A separate inkable developer zone E1, E2 is thereby associated with each recording medium position on the transfer printing station 65. The printing of a toner image in a first color (for example red) over the developer zone E2 thereby occurs in a first pass through the transfer printing station 65. The toner image of this first color is subsequently fixed in the fixing station 68, whereby a shrinking of the recording medium occurs, and the recording medium 60 is re-fed without turnover to the transfer printing station 65 with the associated developer zone E1. The deflection device 28 is thereby located in the pass position and the recording medium is only offset in terms of width under retention of the front side-back side association. In the second pass through the transfer printing station 65, a second toner image with the second color (for example black) is superimposed on the first fixed toner image with the first color (red), and a two-color overall image is thus generated. The superimposed toner image is then re-fixed in the fixing station 68 and the recording medium printed on one side is deposited in the stacker 72.

Further details with regard to the printing system according to FIG. 3 are to be learned from the aforementioned EP 0 699 31 A1, which is herewith incorporated into the disclosure content of the present patent application.

A further application for the present preferred embodiment for shrinkage compensation is given with the arrangement of printers as a twin system. Two printers are hereby coupled with one another such that two printers effect two printing processes in succession with intermediate fixing. For example, a first printer prints the paper front side and the second printer prints the paper back side. The fixing occurs after the first printing process, whereby the shrinkage effect occurs. A turnover device or a pass-through device can be arranged between the first printer and the second printer. The already-described two-color simplex printing or the duplex printing can be realized in this manner with a twin printing system.

Figure 4:
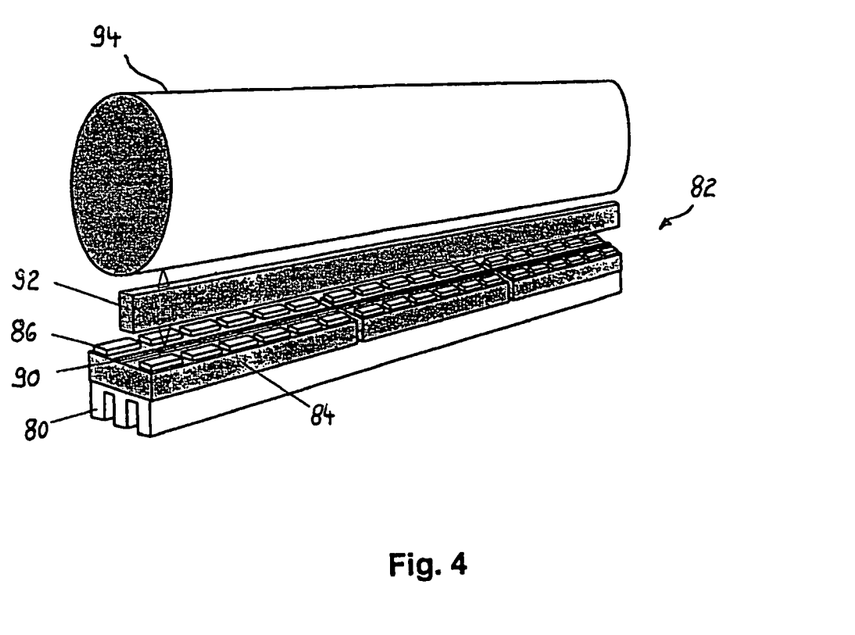
FIG. 4 shows an arrangement with an LED character generator.

FIG. 4 shows a printing group with an LED character generator. A module plate 84 that bears a plurality of driver ICs (integrated circuits) 86 as well as a row 88 with LEDs (light-emitting diodes) 90 operating system arranged on a carrier 80 (designed as a heat sink) of the LED character generator 82. Each LED corresponds to a print point. The separation of the LEDs in the row 90 corresponds to the desired resolution of the print image. The light radiation surfaces of the LEDs are mapped on a photoconductor 94 with a fiberglass optic (what is known as a SELFOC component 92 or a microlens array) at a scale of 1:1. A latent electrostatic image that can be inked with toner by a developer station arises in this manner on the surface of the photoconductor 94. Since a separate light source is present for each image point of an exposure row 90, an entire image point line on the photoconductor surface can be exposed via activation of all LEDS at the same point in time without movement of parts in the character generator.

Figure 5:
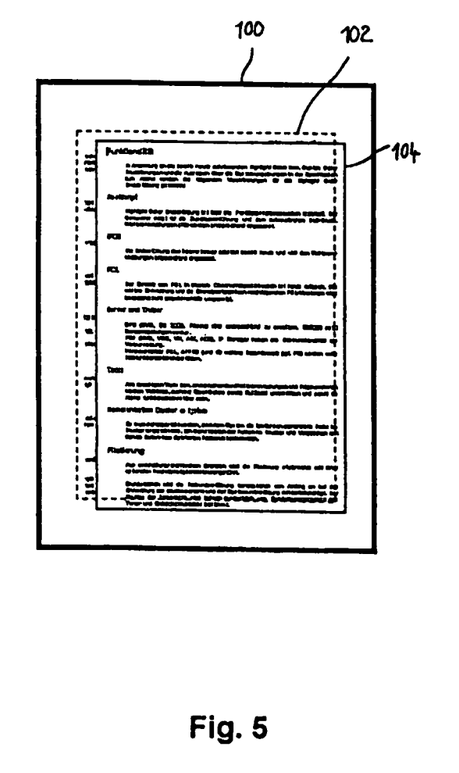
FIG. 5 shows a single sheet with duplex printing.

Using an example, FIG. 5 shows the problem occurring due to the shrinking in the duplex printing operation. Given printing of duplex pages it is felt to be disruptive when the text or the image shows through from the back side. This can in particular not be prevented given thin papers, which is why it is endeavored to align text and images precisely relative to one another on the front side and on the back side. The disturbance arising from the translucence is namely unobtrusive when the printing on the one side begins exactly where the printing on the side ended. As a typical measure it has proven of value that the text is prepared as a justification, whereby equal line lengths result and the disadvantageous effect is relatively unobtrusive. When due to the fixing process occurring after the printing of the one side leads to shrinking of the paper, the mentioned disturbance due to the translucence is not to be corrected. A sheet 100 printed on two sides is schematically shown in FIG. 5. A dashed frame 102 shows the print format for a back side. An elongated frame 104 shows the print format for the front side. Due to the shrinking, the borders of both frames 102, 104 are no longer congruent, such that the text shows through on the back side. Due to this displacement of both frames 102, 104 relative to one another, a complete compensation of this effect is not possible.

Figure 6:
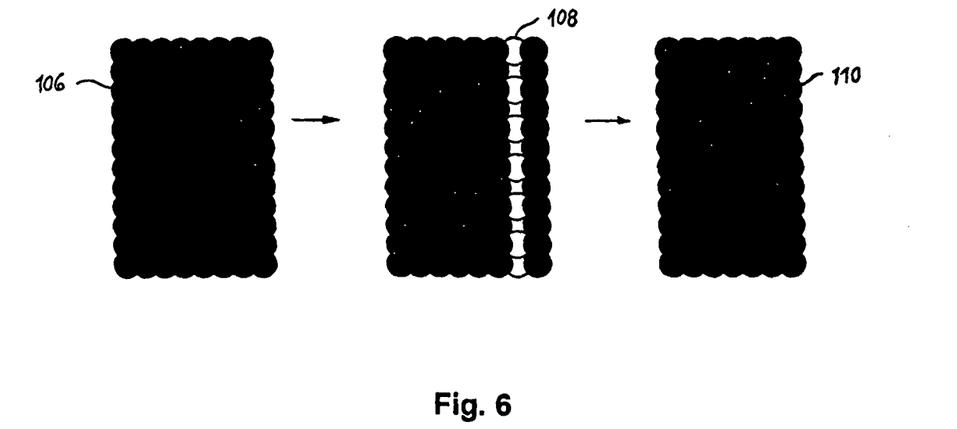
FIG. 6 shows the alteration of a bitmap via omission of an image point column.

FIG. 6 schematically shows a first variant in which the number of the image points is reduced corresponding to the expected shrinkage in the line direction. An output bitmap 106 contains image points arranged in the line direction and in the column direction. This bitmap 106 is reduced in a subsequent step in that the image points of a column 108 are removed. The result is a bitmap 110 that is shortened as viewed in the line direction. This bitmap is then used in the second printing process for the already-shrunk paper, whereby the shrinkage in the line direction that occurred in the fixing after the first printing process has been compensated. A compensation of the shrinking in the column direction, i.e. generally in the direction of the transport of the paper, can occur via increase of the print speed or via increase of the transport speed as this has already been explained further above using other examples.

Figure 7:
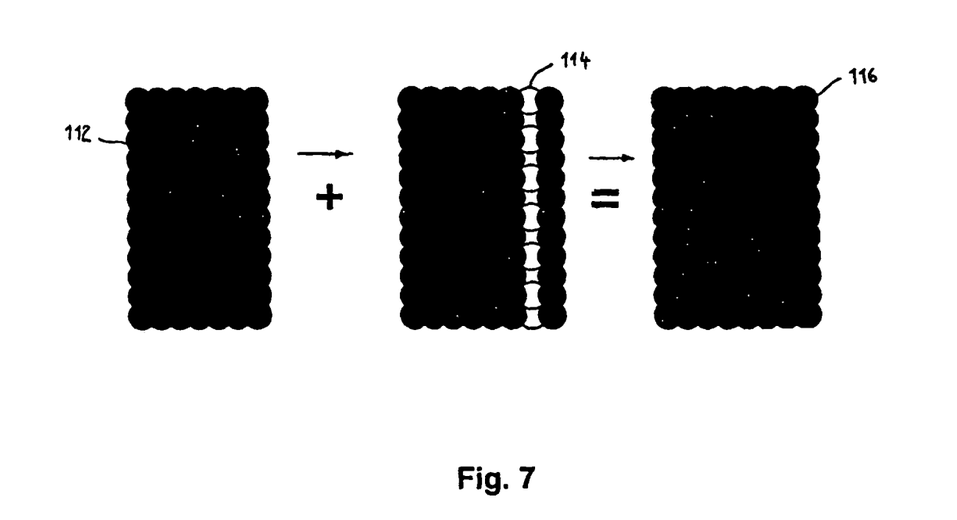
FIG. 7 shows the alteration of a bitmap via addition of an image point column.

FIG. 7 shows an example in which image points are added. An output bitmap 112 is altered such that image points of a column 114 are added (viewed in the line direction). These image points of the column 114 are not inked, however the number of the image points of a line is increased. The result is a bitmap 116 that contains at least one image point more as viewed in the line direction. This bitmap 116 is then used in the first print process, whereby a slightly enlarged print image is created. The shrinking occurs in the subsequent fixing process, such that the print image attains the same size as the print image printed in the second print process (corresponding to the size of an output bitmap 112).

Figure 8:
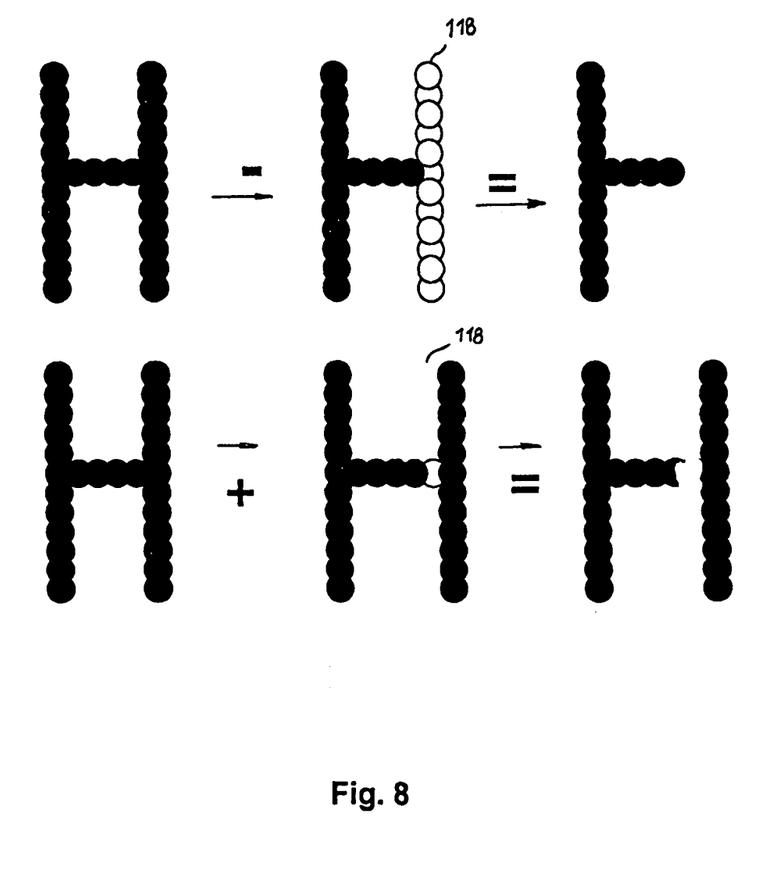
FIG. 8 shows the techniques to according to FIGS. 6 and 7 applied to the letter H.

Both examples according to FIG. 6 and FIG. 7 are equivalent given relatively large objects. However an advantage appears given smaller objects when the procedure according to FIG. 7 is used. The insertion of image point columns namely has the advantage that no information is lost, as the subsequent example of FIG. 8 shows using the letter H. In the upper image part of FIG. 8, the measures according to FIG. 6 are applied, i.e. an image point column 118 was removed from the output bitmap, which inadvertently applied a vertical line for the letter H. The result is then an information reduction because the vertical bars in the letter H no longer appear in the print image. The same example is shown in the lower image part, whereby however the techniques according to FIG. 7 have been applied. The addition of an image point column 118 with un-inked image points leads in the print image H to a minimal disruption in the imaging of the letter H that, however, does not stand out in the overall print image. Thus no information loss occurs in the second variant.

The method shown in FIGS. 6, 7 and 8 can be applied not only in the line direction but rather also in the column direction. Viewed in the transport direction of the recording medium, image point lines are accordingly added in the bitmap for the first print process or image point lines are omitted in the second print process corresponding to the expected shrinkage in the transport direction. The addition or the omission of image point lines advantageously occurs in the region of the line feed in which no inking with toner occurs.

Figure 9:
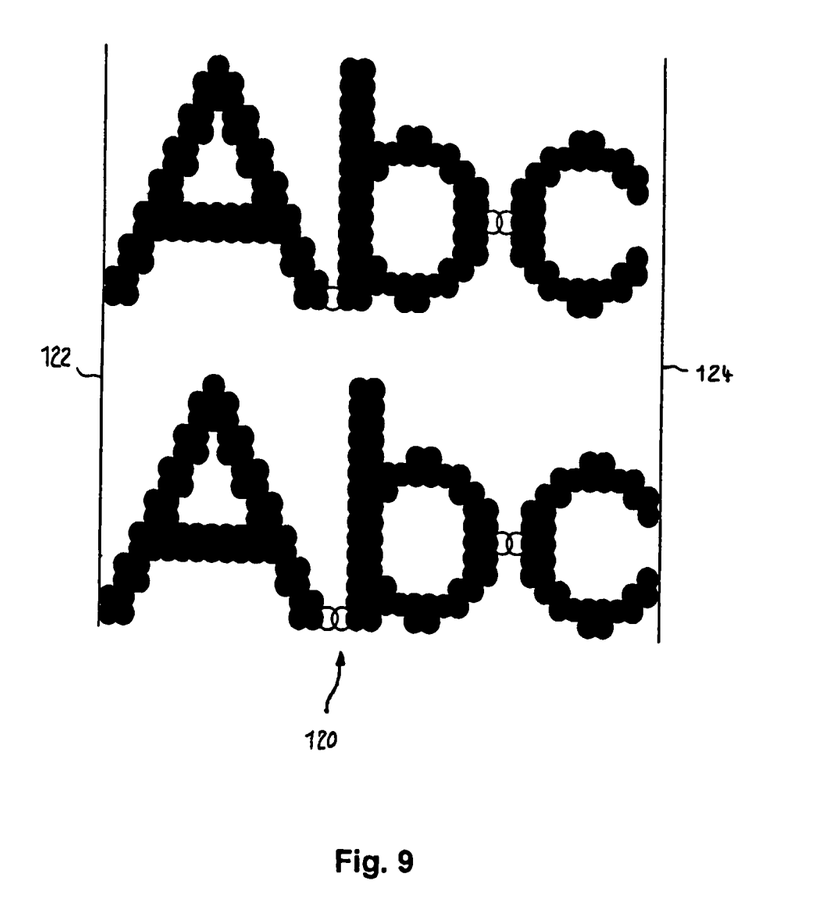
FIG. 9 shows the techniques given the object type text.
Figure 10:
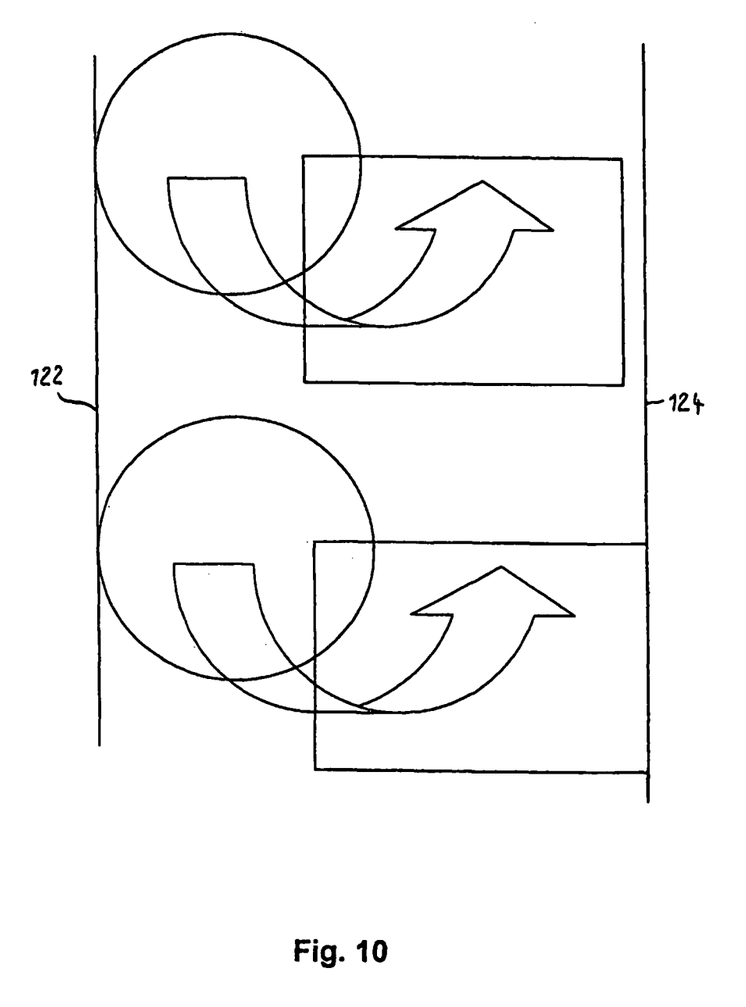
FIG. 10 shows the techniques given the object type graphic.

FIGS. 9 and 10 show further examples of the preferred embodiment in which the object type of the image elements to be printed is initially determined. An adaptation of the image points in the line direction and/or in the column direction occurs corresponding to the expected shrinkage, dependent on the determined object type. An example for the object type text is shown in FIG. 8. In order to achieve a qualitatively high-grade print, it is necessary that the sets and webs are exactly identical given all characters of the same size and same section. This method was used not only in the prepared bitmap for the print page, but rather already in the generation of this bitmap.

FIG. 9 shows an adaptation of the image points in the line direction for the example object type text via insertion of image points 120 in the first print process. Conversely, an omission of image points in the second printing process is also possible, whereby the shrinkage in the line direction is compensated. The border lines 122, 124 allow it to be detected how the line length changes. The insertion or omission of image points occurs in the intervening space between two text characters.

FIG. 10 shows an example for the object type graphic. In software, graphics are represented by vectors and other geometric elements. These can be influenced via a scale factor without the original proportions being changed. In FIG. 10, the scale factor for the lower image part is enlarged, such that the shown graphic completely fills the image frame 122, 124. A scale reduction is naturally also conceivable that is then applied for the second print process.

Images can be adapted relatively simply via insertion and/or omission of columns and lines without a noticeable quality change being visible. The method according to FIG. 6 or 7 can thus be applied here.

As a further method, it is possible for the object type image when the image is located in an unprocessed (undithered) state. It is then possible to generate the image to the desired image size during this process.

A further possibility given the object type image lies in the displacement of the image, whereby a change of the image content is completely avoided. The displacement conforms to the position of the image on the carrier material. If the image is on the edge, it is placed exactly at the new edge. If the image is located in the middle of the print region, it is re-placed according to the shrinkage. The separation from the other objects of the print side is thereby enlarged or reduced.

The shown methods can also be combined among one another. A compensation of the shrinkage in the paper feed direction can thus occur in which the line frequency of the character generator is changed corresponding to the expected shrinkage in the transport direction. To generate the second toner image in the compressed form, the line frequency is then increased relative to the line frequency in the first print process. Another variant lies in changing the transport speed of the recording medium. For example, in the second process the transport speed of the recording medium in the second printing device is reduced relative to the transport speed in the first print process to apply the toner image in a compressed form. Furthermore, the degree of the shrinkage of the recording medium can be empirically determined and the compensation measures effected dependent on the degree of the shrinkage. The shrinkage can, for example, be determined with the aid of vectors that, for example, establish the length difference of a single sheet before and after the first fixing process.

Although preferred exemplary embodiments are shown and described in detail in the drawings and in the preceding specification, this should be viewed as purely exemplary and not as limiting the invention. It is noted that only the preferred exemplary embodiments are shown and described, and all alterations and modifications that presently and in the future lie in the protective scope of the invention should be protected.

We claim as our invention:

1. A method for printing a recording medium, comprising:
   providing digital data for a corresponding print page;
   during generation of a software generated bit map from said digital data and having image points corresponding to image points to be inked for generation of a latent image for a first print process or a second print process, inserting or omitting image points in said bit map for said first print process or said second print process in a direction of at least one main axis corresponding to an expected shrinkage of said recording medium along said main axis;

printing the recording medium with a first toner image in the first print process;

fixing the first toner image on the recording medium in a fixing device where said expected shrinkage occurs along said at least one main axis; and in the second print process, applying a second toner image on the recording medium wherein the first toner image or the second toner image is compressed or expanded to compensate for said shrinkage of the first toner image.

2. The method according to claim 1 in which an object type is determined for said image elements to be printed, and said object type being one of text, graphic, and image.

3. The method according to claim 2, in which, given the object type text, an adaptation of the image points in a line direction occurs via insertion of image points in the first print process or via omission of image points in the second print process.

4. The method according to claim 3 in which the insertion or omission of image points occurs in an intervening space between two text characters.

5. The method according to claim 2 in which, given the object type graphic, graphic vectors and geometric basic elements are used for description of the graphic, and in which the insertion or omission of the image points occurs via alteration of a scale factor for the vectors and the geometric basic elements.

6. The method according to claim 2 in which an adaptation of the image points via displacement of image elements in a line direction or in a transport direction of the carrier material occurs given the object type image.

7. The method according to claim 6 in which the displacement for the image elements occurs relative to an edge position, where the expected shrinkage in the line direction or in the transport direction is taken into account for the recording medium and a change of edge position connected with this.

8. A device for printing of a recording medium, comprising:

a printing group that prints the recording medium with a first toner image in a first print process, and the printing group or a further printing group prints the recording medium with a second toner image in a second print process;

a fixing device that fixes the first toner image on the recording medium where the recording medium has expected shrinkage of said recording medium along at least one main axis as a result of said fixing;

a control unit which, for a corresponding print page based on digital data, generates a software generated bitmap from said digital data and having image points corresponding to image points to be inked for generation of a latent image, said control unit, for the first print process or the second print process, implementing an insertion or an omission of image points in said bit map in a direction of a main axis corresponding to said expected shrinkage; and the printing group or said further printing group in the second print process, when it applies the second toner image on the recording medium, the first toner image or the second toner image is compressed or expanded to compensate for said shrinkage of said first toner image.

9. A device according to claim 8 wherein an object type for the image elements to be printed comprises text, graphic, or image.

10. A device according to claim 9 wherein given the object type text, the control unit implements an adaptation of the image points in a line direction via insertion of image points in the first print process or via omission of image points in the second print process.

11. A device according to claim 9 wherein the control unit inserts or omits image points in an intervening space between two text characters.

12. A device according to claim 9 wherein graphic vectors and geometric basic elements serve for description of a graphic given the object type graphic, and the control unit adapts the image points via alteration of a scale factor for the vectors and the geometric basic elements.

13. A device according to claim 9 wherein the control unit adapts the image points via displacement of image elements in a line direction or in a transport direction of the carrier material given the object type image.

14. A device according to claim 13 wherein the control unit implements the displacement for the image points relative to an edge position and thus accounts for the expected shrinkage in the line direction or in the transport direction for the recording medium and a change of edge position connected therewith.

15. A method for printing a recording medium, comprising:

providing digital data for a corresponding print page;

during generation of a software generated bit map from said digital data and having image points corresponding to image points to be inked for generation of an image for a first print process or a second print process, inserting or omitting image points in said bit map for said first print process or said second print process in a direction of at least one main axis corresponding to an expected shrinkage of said recording medium along said main axis;

printing the recording medium with a first image in the first print process;

heating the first image on the recording medium in a heating device where said expected shrinkage occurs along said at least one main axis; and in the second print process, applying an image on the recording medium wherein the first image or the second image is compressed or expanded to compensate for said shrinkage of the first image.

16. A method according to claim 15 in which object type text, object type graphic and object type image are used as an object type for the image elements to be printed.

17. A method according to claim 16, in which, given the object type text, an adaptation of the image points in a line direction occurs via insertion of image points in the first print process or via omission of image points in the second print process.

18. A method according to claim 17 in which the insertion or omission of image points occurs in an intervening space between two text characters.

19. A method according to claim 16 in which, given the object type graphic, graphic vectors and geometric basic elements are used for description of the graphic, and in which the adaptation of the image points occurs via alteration of a scale factor for the vectors and the geometric basic elements.

20. A method according to claim 16 in which an adaptation of the image points via displacement of image elements in a line direction or in a transport direction of the carrier material occurs given the object type image.

21. A method according to claim 20 in which the displacement for the image elements occurs relative to an edge position, where the expected shrinkage in the line direction or in the transport direction is taken into account for the recording medium and a change of edge position connected with this.

22. A device for printing of a recording medium, comprising:
- a printing group that prints the recording medium with a first image in a first print process, and the printing group or a further printing group prints the recording medium with a second image in a second print process;
- a heating device that heats the first toner image on the recording medium where the recording medium has expected shrinkage of said recording medium along at least one main axis as a result of said heating;
- a control unit which, for a corresponding print page based on digital data, generates a software generated bitmap from said digital data and having image points corresponding to image points to be inked for generation of an image, said control unit, for the first print process or the second print process, implementing an insertion or an omission of image points in said bit map in a direction of a main axis corresponding to said expected shrinkage; and
- the printing group or said further printing group in the second print process, when it applies the second image on the recording medium, the first image or the second image is compressed or expanded to compensate for said shrinkage of said first image.

23. A device according to claim 22 wherein the object type for the image elements to be printed comprises object type text, object type graphic, or object type image.

24. A device according to claim 23 wherein given the object type text, the control unit implements an adaptation of the image points in a line direction via insertion of image points in the first print process or via omission of image points in the second print process.

25. A device according to claim 22 wherein the control unit inserts or omits image points in an intervening space between two text characters.

26. A device according to claim 23 wherein graphic vectors and geometric basic elements serve for description of a graphic given the object type graphic, and the control unit adapts the image points via alteration of a scale factor for the vectors and the geometric basic elements.

27. A device according to claim 23 wherein the control unit adapts the image points via displacement of image elements in a line direction or in a transport direction of the carrier material given the object type image.

28. A device according to claim 27 wherein the control unit implements the displacement for the image points relative to an edge position and thus accounts for the expected shrinkage in the line direction or in the transport direction for the recording medium and a change of edge position connected therewith.

* * * * *